A. T. ELLIOTT & A. MILLER.
PROCESS OF OBTAINING METALS FROM THEIR ORES.
APPLICATION FILED SEPT. 15, 1908.
937,293.
Patented Oct. 19, 1909
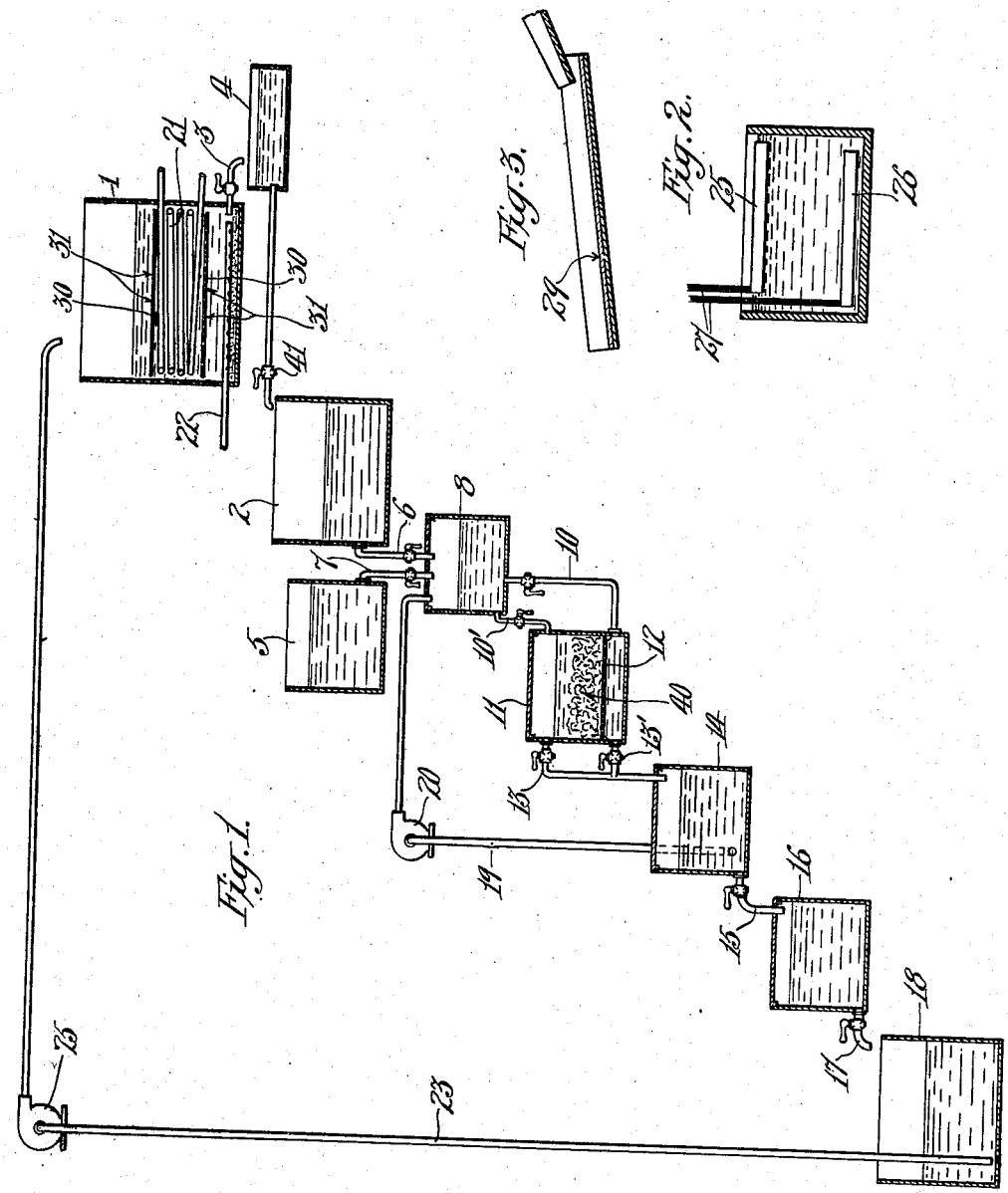

UNITED STATES PATENT OFFICE.

ALEXANDER T. ELLIOTT AND ALBERT MILLER, OF LOS ANGELES, CALIFORNIA; SAID ELLIOTT ASSIGNOR TO SAID MILLER.

PROCESS OF OBTAINING METALS FROM THEIR ORES.

937,293. Specification of Letters Patent. Patented Oct. 19, 1909.

Application filed September 15, 1908. Serial No. 453,181.

*To all whom it may concern:*

Be it known that we, ALEXANDER T. ELLIOTT, a subject of the King of the United Kingdom of Great Britain and Ireland, and ALBERT MILLER, a citizen of the United States, both residing at Los Angeles, in the county of Los Angeles and State of California, have invented a new and useful Process for Obtaining Metals from Their Ores, of which the following is a specification.

This invention relates to a process for recovering gold, together with copper, zinc, nickel and cobalt values from carbonate, silicate or oxid ores or from roasted sulfid ores.

The main object of the present invention is to provide for simultaneous extraction of any two or more of the above named metals from ores containing the same in combination or mixture.

A further object of the invention is to provide for extraction of the metals by cold solution.

Another object of the invention is to effect this result by the use of a solution which is substantially neutral, thereby preventing interference with the operation by the presence of base metals, and also avoiding loss by waste of iron due to presence of acid in the precipitating tank, when the precipitation is effected by scrap iron.

Another object of the invention is to so treat an ore containing copper and gold that the copper will be removed from the gold and as much of the gold as is not extracted will be left in a condition suitable for amalgamation.

An essential feature of the process is the treatment of the ore with a leaching solution containing sufficient ferric sulfate, together with sodium chlorid, for the extraction of the copper, zinc, nickel or cobalt and with sufficient chlorin for full or partial extraction of any gold that may be present.

The process consists in leaching the ore crushed to a suitable state of division with a solution of ferric sulfate containing also sodium chlorid and a proportion of free chlorin and thereby dissolving the copper, zinc, nickel and cobalt values the ore may contain and some or all of the gold and separating the resulting solution from the ore, precipitating the copper, zinc, etc. from the solution, and regenerating the solution by oxidation of the ferrous sulfate therein to ferric sulfate by generating nascent oxygen in the solution and utilizing the regenerating solution for the repetition of the process on another body of ore.

The accompanying drawings illustrate an apparatus suitable for carrying out the process.

Figure 1 is a diagrammatic section of the apparatus. Fig. 2 is a section of an alternative form of regenerating tank. Fig. 3 is a vertical section of an amalgamating means.

1 designates the oxidizing or regenerating tank wherein the ferrous sulfate is oxidized to ferric sulfate. Said tank is provided with a heating coil 21 which may be a steam coil, and with pipes 22 through which air under pressure from a suitable source may be blown into the tank.

2 designates a tank for holding the ferric sulfate solution, the regenerating tank 1 having a valved outlet 3 for discharging the regenerated liquor into a settling or regenerating tank 4, which discharges into tank 2 by a valved outlet 41. A chlorin tank 5 may be located alongside of tank 2, the two tanks 2 and 5 discharging by pipes 6 and 7 into the leaching liquor tank 8. From the bottom of said leaching liquor tank a pipe 10 leads to the bottom of the leaching tank 11 which has a false bottom 12 to support the ore 40 and an outlet pipe 13 from its upper part discharging into a storage tank 14 whose outlet 15 discharges into a precipitation tank 16. Said precipitating tank has a valved outlet 17 discharging into the sump 18. A return or circulation pipe 19 leads from the bottom of the storage tank 14 to a pump 20 which forces the leaching liquor from the storage tank to the top of the leaching liquor tank 8 establishing circulation of the leaching liquor. There is also a circulation for the entire system by pipe 23 and pump 25 from the sump 18 back to the oxidizing or regenerating tank 1. Outlets 10' and 13' are also provided from tank 8 to top of tank 11, and from the bottom of tank 11 to outlet 15.

The process is generally applicable for the extraction of any metal whose oxid or carbonate is attacked by ferric sulfate. Such ores are herein termed oxidized ores in contradistinction to sulfid ores.

The process is principally intended for the recovery of copper, zinc, cobalt or nickel occurring together with gold.

The process will be described with special reference to a copper oxid ore containing some gold and is carried out in the above described apparatus as follows:

Tank 1 is charged with a solution of ferrous sulfate in water together with a small quantity of sodium chlorid, and a quantity of manganese dioxid is placed in the tank, the tank being warmed, as by means of steam coil 21 until the ferrous sulfate has been converted to ferric sulfate by the action of the manganese dioxid. In this operation the ferrous sulfate and manganese dioxid react by double decomposition to form ferric sulfate, ferric hydrate and manganese sesquioxid, according to the following equation:

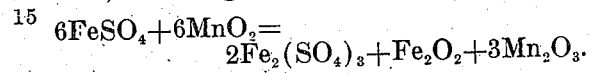
$$6FeSO_4 + 6MnO_2 = 2Fe_2(SO_4)_3 + Fe_2O_2 + 3Mn_2O_3.$$

It is preferred to inject air into the solution at the same time through the pipe 22, so as to continually reconvert the reduced manganese compound to manganese dioxid, and by suitable agitating means, for example, by injection of the air, the contents of the tank should be kept in motion, so that the action of the manganese dioxid will be effected throughout the fluid. When the ferrous salt has thus been completely converted into ferric salt, the solution is first settled to allow the manganese dioxid to settle out, and is then run off to the separator, indicated at 4, for separation of the ferric hydrate. The clear liquor is then run into the storage tank 2, whence it is drawn from time to time through outlet 6 into leaching liquor tank 8 as required. The tank 5 is charged with water containing chlorin in a condition from which it is easily liberated, as for example, by treating chlorid of lime with water to extract the chlorin therefrom in the form of calcium hypo-chlorite. A small proportion of sodium bromid is also added to the solution and the resulting solution is run into the leaching liquor tank through the outlet 7 just before the leaching liquor is run onto the ore.

The proportions in the leaching liquor may be about as follows: enough ferrous sulfate is used to make about three pounds of ferric salt per pound of copper to be extracted, with enough water to form a concentrated solution, and sodium chlorid amounting to about fifty to one hundred pounds per ton of ore. The quantity of manganese dioxid used is about twenty-five per cent of the weight of the ferrous sulfate. For ore containing about ten dollars of gold to the ton, the chlorin extracted from about forty pounds of chlorid of lime will be used per ton of ore, and to this will be added about five pounds of sodium bromid per ton of ore. The chlorin may be produced in any other well known way, for example, by electrolysis. Whether in the form of hypo-chlorite solution or as chlorin water, the chlorin will be presented in a condition which is unstable in contact with any metal subject to attack by chlorin. The term "free chlorin" is herein used to designate this condition as distinct from a state of combination which is stable in the presence of such metal. The leaching liquor having been prepared as stated, the ore is placed in leaching tank 8, said ore having been crushed to suitable condition of fineness. For the extraction of the copper alone 20 mesh is sufficiently fine, but if any considerable extraction of gold value is desired 40 or even 60 mesh is preferable. The leaching liquor is passed through the ore, preferably from below upward, and it may be passed continually in this manner, passing from the outlet 10 of the leaching liquor tank into the bottom of the leaching tank, upwardly through the leaching tank, then through the outlet thereof to the storage tank 14, whence it is pumped through means 19, 20, back to the leaching liquor tank, the leaching liquor thus passing in a continuous circulation. If desired, however, this circulation may be intermittent. By maintaining the circulation for a sufficient period, substantially all of the copper will be dissolved by the action of the ferric salt, the reaction with the oxid ore being as follows:

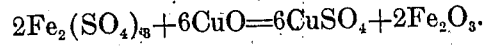
$$2Fe_2(SO_4)_3 + 6CuO = 6CuSO_4 + 2Fe_2O_3.$$

At the same time the gold or a portion thereof that may be present in the copper ore is dissolved by the action of the chlorin and of the bromin in the leaching liquor, it being understood that the action of the chlorin water on the sodium bromid will release bromin in the free state. By the addition of the sodium chlorid to the leaching solution, the extraction of the copper is caused to take place in cold solution, which enables the simultaneous use of chlorin for extraction of gold values. The sodium chlorid may, however, be omitted, the leaching solution in that case being heated sufficiently to enable the ferric sulfate to leach the ore, but not sufficiently to expel the chlorin. The copper sulfate solution in the storage tank 14 may be drawn off from time to time into the precipitating tank 16 and the residue in the leaching tank is washed by water sprayed thereunto, the wash water being also run off into tank 16, where the copper is precipitated by any suitable means, for example, by scrap iron, which will also precipitate the gold contents. This precipitating action introduces iron into the solution, which compensates for the iron lost in the form of hydrate or oxid in the regenerating tank and in the leaching tank, forming a solution of ferrous sulfate, which may be run off into the sump 18 and pumped back from time to time into the regenerating tank 1 where it is then oxidized to ferric sulfate, as before. A limited quantity of ferrous sulfate thus being used for treatment of an indefinitely large amount of ore in the regeneration of the ferrous salt by means of manganese dioxid under the application of heat, the oxidation of the ferrous salt is effected by oxygen liberated in the nascent state from the manganese dioxid; and our invention contemplates the use of any means which will provide for action on the ferrous salt by oxygen in the nascent state, for example, by electrolytic means, as indicated in Fig. 2, where 25 represents the anode and 26 the cathode of an electric circuit 27 supplied from any suitable source, said anode and cathode being disposed respectively at the upper and lower portion of the regenerating tank 1.

If a sufficiently large percentage of zinc, nickel or cobalt is present, they may be precipitated electrolytically or otherwise, after the copper has been separated. If insufficient percentage of these metals is present to justify the extraction at the first operation, the solution may be used over again and after repeated extraction and precipitation of copper, enough zinc, etc. may accumulate in the solution for economical precipitation thereof.

In case the ore carries extremely large copper values, it is preferable to first extract with ferric sulfate and sodium chlorid solution without the chlorin, running off most of the solution, but leaving enough to furnish the copper required for carrying the gold values. The chlorin is then added and the gold thereby fully or partly extracted. The resulting two solutions may be treated separately.

If the gold is rather coarse, the stated solution will not fully dissolve it in the time required for economical operation, but in that case the gold is left in a clear state free from copper, etc., so that it is adjusted for immediate and full recovery by amalgamation, for example, on an amalgamation plate, indicated at 29 in Fig. 3.

If the ore is in sulfid form, it should be roasted before application of this process thereto.

It is desirable to add a small quantity of sulfuric acid, say about two per cent., to the ferrous sulfate solution to prevent as far as possible, the precipitation of basic salt in the regeneration.

Horizontal perforated disks 30, with alternate perforations 31, may be provided for baffling the air as it rises in the regenerating tank, thereby increasing its efficiency in oxidation of the ferrous salt.

What we claim is:—

1. The process for the simultaneous recovery of gold, together with another metal whose sulfate and chlorid are soluble in water, namely, copper, zinc, etc., from their ores, which consists in subjecting the ore to the action of a solution of ferric sulfate containing sodium chlorid and free chlorin, thereby dissolving copper, zinc, etc., and some or all of the gold, drawing off the solution, precipitating the copper, etc., and the gold, producing ferrous sulfate and oxidizing said ferrous sulfate to ferric sulfate for a repetition of the process.

2. The process of recovering gold together with copper, which consists in subjecting the ores of said metals to the action of a solution of ferric sulfate containing sodium chlorid and free chlorin, thereby dissolving part or all of the gold and also dissolving the copper, drawing off the solution, precipitating the gold and copper from the solution by the action of iron, and oxidizing the resulting ferrous sulfate solution to ferric sulfate in solution by the action of manganese dioxid.

3. The process of recovering gold together with copper, which consists in subjecting the ores of said metals to the action of a solution of ferric sulfate containing sodium chlorid and free chlorin, thereby dissolving part or all of the gold and also dissolving the copper, drawing off the solution, precipitating the gold and copper from the solution by the action of iron, oxidizing the resulting ferrous sulfate solution to ferric sulfate in solution by the action of manganese dioxid, and regenerating said manganese dioxid by acting thereon with atmospheric air.

4. The process of recovering gold together with copper, which consists in subjecting the ores of said metals to the action of a solution of ferric sulfate containing sodium chlorid and free chlorin, thereby dissolving part or all of the gold and also dissolving the copper, drawing off the solution, precipitating the gold and copper from the solution by the action of iron, and oxidizing the resulting ferrous sulfate solution to ferric sulfate in solution by the action of nascent oxygen.

5. The process which consists in oxidizing ferrous sulfate to ferric sulfate by the action of nascent oxygen on a solution of ferrous sulfate, together with sodium chlorid, adding chlorin to the solution, leaching ore containing gold and copper with said solution, and separating the extracted metals from the solution.

6. The process for the simultaneous recovery of gold, together with another metal whose sulfate and chlorid are soluble in water, namely, copper, zinc, etc., from their ores, which consists in subjecting the ore to the action of a solution of ferric sulfate containing sodium chlorid and free chlorin, thereby dissolving copper, zinc, etc., and some or all of the gold, drawing off the solution, precipitating the copper and the gold by the action of iron, producing ferrous sulfate, subsequently separating the zinc from the solution, oxidizing said ferrous sulfate to ferric sulfate for a repetition of the process, and subjecting the residue of the leaching apparatus to amalgamation to recover the unextracted gold.

7. The process for the simultaneous recovery of gold, together with another metal whose sulfate and chlorid are soluble in water, namely, copper, zinc, etc., from their ores, which consists in subjecting the ore to the action of a solution of ferric sulfate containing free chlorin, thereby dissolving copper, zinc, etc., and some or all of the gold, drawing off the solution, precipitating the copper and the gold by the action of iron, producing ferrous sulfate, subsequently separating the zinc from the solution, and oxidizing said ferrous sulfate to ferric sulfate for a repetition of the process.

8. The process of recovering gold together with a metal forming soluble sulfates and chlorids, which consists in subjecting the ores of said metals to the action of the solution of ferric sulfate containing free chlorin, thereby dissolving part or all of the gold and also dissolving the stated other metal, drawing off the solution, precipitating the gold and other metal from the solution by the action of iron, and oxidizing the resulting ferrous sulfate solution to ferric sulfate in solution by the action of manganese dioxid.

9. The process which consists in oxidizing ferrous sulfate to ferric sulfate by the action of nascent oxygen on a solution of ferrous sulfate, together with sodium chlorid, and a relatively small quantity of sulfuric acid, adding chlorin to the solution, leaching ore containing gold together and another metal whose sulfate is soluble in water, with said solution, and separating the extracted metals from the solution.

10. The process for the recovery of metal whose sulfate and chlorid are soluble in water, namely, copper, zinc, etc., from its ores, which consists in subjecting the ore to the action of a solution of ferric sulfate containing sodium chlorid, thereby dissolving said metal, drawing off the solution, precipitating the metal and producing ferrous sulfate, and oxidizing said ferrous sulfate to ferric sulfate for repetition of the process.

11. The process which consists in leaching an oxidized ore of copper with a solution of ferric sulfate containing sodium chlorid, precipitating the copper by the action of iron, thereby producing ferrous sulfate in solution, and subjecting the solution to the action of nascent oxygen to produce ferric sulfate and ferric hydrate, for regenerating the ferric sulfate for a repetition of the process, and for separating from the solution the iron added in the precipitation of the copper.

12. The process for simultaneous recovery of a plurality of metals whose sulfates and chlorids are soluble in water, namely, copper, zinc, etc., from their ores, which consists in subjecting the ore to a solution of ferric sulfate, thereby dissolving the metals, drawing off the solution, precipitating the copper by the action of iron, producing ferrous sulfate, subsequently separating the other metal from the solution, and oxidizing said ferrous sulfate to ferric sulfate for the repetition of the process.

13. The process for simultaneous recovery of a plurality of metals whose sulfates or chlorids are soluble in water, namely, copper, zinc, etc., from their ores, which consists in subjecting the ore to a solution containing ferric sulfate, sodium chlorid, thereby dissolving the metals, drawing off the solution, precipitating by the action of iron the copper or other metal which is precipitable by such action, producing ferrous sulfate, subsequently separating the zinc, etc. from the solution, and oxidizing said ferrous sulfate to ferric sulfate by the action of manganese dioxid for the repetition of the process and regenerating the manganese dioxid by the action of atmospheric air.

14. The process which consists in leaching an oxidized ore of copper, with a solution of ferric sulfate containing sodium chlorid precipitating the copper by the action of iron, thereby producing ferrous sulfate in solution, and subjecting the solution to the action of nascent oxygen to produce ferric sulfate and ferric hydrate, for regenerating the ferric sulfate for a repetition of the process, and for separating from the solution the iron added in the precipitation of the copper.

15. The process for simultaneous recovery of copper and another metal whose sulfate is soluble in water from an oxidized ore of said metals, which consists in subjecting the ore to a solution of ferric sulfate, thereby dissolving the metals, drawing off the solution, precipitating the copper by the action of iron, producing ferrous sulfate, subsequently separating the other metal from the solution, and oxidizing said ferrous sulfate to ferric sulfate for the repetition of the process.

16. The process which consists in leaching an oxidized ore of copper with a solution of ferric sulfate together with sodium chlorid, precipitating the copper from the solution by the action of iron, thereby producing ferrous sulfate in the solution, and acting on said solution by nascent oxygen to regenerate the ferrous sulfate to ferric sulfate and simultaneously precipitate as ferric hydrate the iron taken up during the precipitation of the copper.

17. The process which consists in leaching an oxidized ore of copper, precipitating the copper by the action of iron, thereby producing ferrous sulfate in solution, and subjecting the solution to the action of manganese dioxid to produce ferric sulfate and ferric hydrate, for regenerating the ferric sulfate for a repetition of the process, and for separating from the solution the iron added in the precipitation of the copper.

18. The process which consists in leaching an oxidized ore of copper, precipitating the copper by the action of iron, thereby producing ferrous sulfate in solution, subjecting the solution to the action of manganese dioxid to produce ferric sulfate and ferric hydrate, thereby regenerating the ferric sulfate for a repetition of the process, separating from the solution the iron added in the precipitation of the copper, and regenerating the manganese dioxid by the action of air on the solution.

In testimony whereof, we have hereunto set our hands at Los Angeles, California, this 5th day of September 1908.

ALEXANDER T. ELLIOTT.
  ALBERT MILLER.

In presence of—
 ARTHUR P. KNIGHT,
 FRANK L. A. GRAHAM.